Patented Jan. 17, 1933

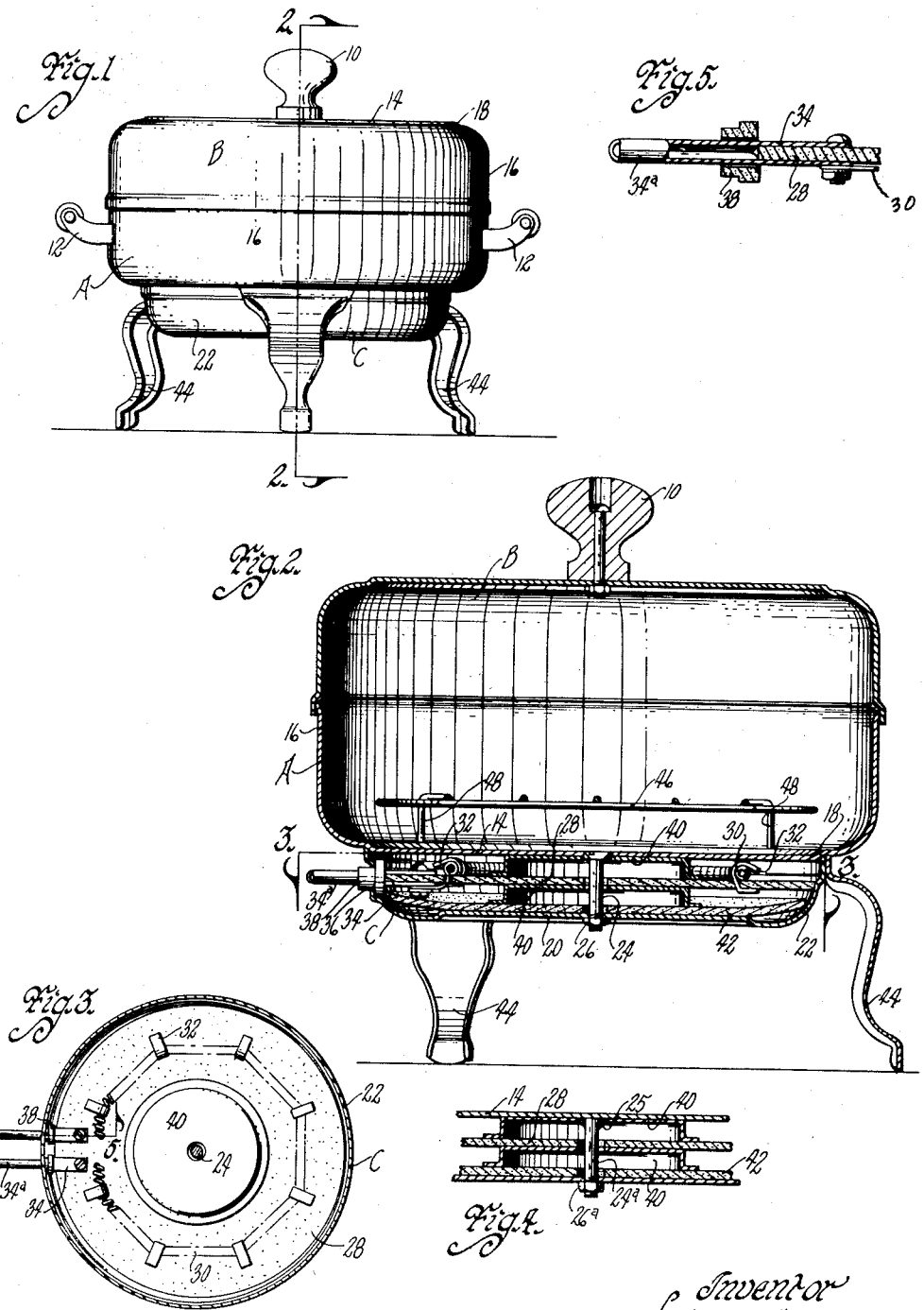

1,894,875

UNITED STATES PATENT OFFICE

ANDREW S. KNAPP, OF BELLEVILLE, ILLINOIS, ASSIGNOR TO KNAPP-MONARCH COMPANY, OF BELLEVILLE, ILLINOIS, A CORPORATION OF MISSOURI

BAKING OVEN

Application filed October 31, 1932. Serial No. 640,423.

One object of my invention is to provide a baking oven adapted to be energized by electricity and being of the appliance type, that is, one which is portable and is of small size so that it can be positioned on a table top or the like.

A further object is to provide a baking oven which is substantially simple in construction and therefore inexpensive to manufacture.

More particularly it is my object to provide a baking oven comprising an open top container, a removable cover therefor and a heating element below the container, the heating element being encased and being supported in novel manner relative to the container.

A further object is to provide a false bottom below a baking container adapted to encase a heating element and support it against buckling and properly spaced below the bottom of the baking container, a grid being provided in the container for supporting articles to be baked.

With these and other objects in view my invention consists in the construction, arrangement and combination of the various parts of my device, whereby the objects contemplated are attained, as hereinafter more fully set forth, pointed out in my claims and illustrated in the accompanying drawing, in which:—

Figure 1 is a side elevation of a baking oven embodying my invention.

Figure 2 is an enlarged sectional view on the line 2—2 of Figure 1.

Figure 3 is a plan sectional view on the line 3—3 of Figure 2 showing the parts on a reduced scale.

Figure 4 is an enlarged sectional view of the lower central part of Figure 2 except showing a modified construction; and Figure 5 is an enlarged sectional view of an electrical connection plug used for the heating element of my invention.

On the accompanying drawing, I have used the reference character A to indicate generally an open top container. A cover B is provided therefor. The cover B is removable, a knob 10 being provided on it for convenience in handling it.

The container A is preferably provided with handles 12 so that it can be carried and moved from one place to another. The container A comprises a bottom 14 and a peripheral annular side wall 16, the cover B being formed as shown in Figure 2 to fit over the upper edge of the side wall 16.

The bottom 14 of the container A has an annular bead or shoulder 18. Below the bottom 14 I provide a false bottom C having a bottom portion 20 and an annular side wall 22. The upper edge of the annular side wall 22 is adapted to coact with the bead 18 to position the false bottom C laterally relative to the container A.

To minimize the number of parts and time required in assembly, a single central tie means is preferable as a connection between the container A and the false bottom C. For this purpose I provide a bolt 24 extending through the bottom 14 and through the bottom 20. A nut 26 is positioned thereon. By the combination of the bolt and its nut 26 and the coacting bead and wall 18 and 22, an effective assembly connection is provided between the parts A and C.

In Figure 4 I have shown a modified construction in which a bolt 24a is shown having a nut 26a. The bolt 24a does not extend through the bottom 14, but is welded thereto as indicated at 25.

Within the false bottom C which serves as a heating element casing, I provide a heating element consisting of a supporting plate 28, a coil of resistance wire 30 secured thereto by clips 32 and connector prongs 34. The prongs 34, as shown in Figure 5, are each formed of a strip of metal bent U-shaped with portions 34a formed tubular to fit the standard types of cord connections which ordinarily have a pair of spaced sockets to receive spaced plugs of an electric appliance. The casing C is perforated as indicated at 36 and insulating bushings 38 surround the portions 34a to prevent short circuit between the plugs 34 by their contact with the casing C.

The resistance wire support 28 is made of suitable insulating and heat resisting material. If unsupported, it might have a tendency to buckle in the middle. To guard against this and provide a positive support for the plate or disc 28, I provide spaced members 40. These surround the bolt 24 and are made, preferably, cup shaped so that peripheral portions thereof serve as spacers substantially mid-way between the bolt 24 and the wall 22 of the casing C. I have shown one above and the other below the plate 28 so as to positively guard against either up or down movement of the plate. If weight is the only thing to be taken into consideration, the spacer below the plate 28 would be the only one needed.

To conserve heat within the casing C and deflect it toward the container A, I provide a disc of insulation 42 against the bottom 20 of the casing C.

Supporting legs 44 are secured to the casing C so that when it is assembled relative to the container A the container is supported on the legs.

A baking oven of the character disclosed is especially adapted for baking potatoes. To keep them from burning, by contact with the hot plate 14, a wire grid 46 is provided having supporting legs 48 to rest on the bottom 14 of the container A. Other vegetables or biscuits or the like can be placed on the grid and thus the appliance is adapted to be conveniently used for a number of different baking operations.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An appliance of the character described comprising a container, a cup-shaped heating element casing therebelow, tie means at the center of said appliance for holding said cup-shaped heating element casing assembled relative to said container, a heating element within said heating element casing and including a supporting plate and spacer means surrounding said tie means to space said supporting plate above the bottom of said heating element casing, said spacer means including a peripheral portion substantially spaced from said tie means.

2. An appliance of the character described comprising a container, a cup-shaped heating element casing therebelow, means at the center of said appliance for holding said cup-shaped element casing assembled relative to said container, a heating element within said heating element casing and including a supporting plate and spacer means surrounding said first means to space said supporting plate above the bottom of said heating element casing, said spacer means comprising a cup-shaped element of substantially half the diameter of said cup-shaped heating element casing.

3. In an electric baking oven, an open top cup-shaped container, a cap-shaped cover complementary therewith and removable therefrom, a cup-shaped heating element casing below and contacting with said container and being of a diameter less than said container, a heating element in said heating element casing, means extending through said casing, said container and said heating element for retaining them assembled relative to each other and means on said last means for positioning said heating element above the bottom of said casing.

4. In a baking oven, a relatively shallow, open top, cup-shaped container, a cap-shaped cover having parts interfitting therewith whereby said container and cover provide substantially a closed baking oven, a casing of relatively shallow depth and smaller in diameter than the bottom of said cup-shaped container and secured thereto, an electrical heating element within said casing above the bottom thereof and below the bottom of said cup-shaped container, means for retaining said heating element in position spaced above the bottom of said casing and legs secured to said casing for supporting it, the container and the cover.

5. An appliance of the character described comprising a relatively shallow container, a cup-shaped heating element casing therebelow and of smaller diameter than said container, tie means comprising a bolt for holding said cup-shaped heating element casing assembled relative to said container, an electric heating element within said heating element casing and including a supporting plate upon which the heating element rests and means surrounding said bolt to retain said supporting plate above the bottom of said heating element casing, said last means being carried by said bolt.

6. In a baking oven, a relatively shallow, open top, cup-shaped container, a cap-shaped cover having parts interfitting therewith whereby said container and said cover, when so interfitted, provide substantially a closed baking oven, a casing of relatively shallow depth and smaller in diameter than the bottom of said cup-shaped container and positioned against the bottom thereof, an electrical heating element within said casing above and insulated from the bottom thereof and spaced below the bottom of said cup-shaped container, means for retaining said electrical heating element in such position and legs secured to said casing for supporting the casing, the container and the cover.

7. In a baking oven, a relatively shallow, open top, cup-shaped container, a cap-shaped cover having a peripheral edge interfitting therewith whereby said container and said cover when so interfitted provide substantially a closed baking oven, a casing of relatively shallow depth and smaller in diameter than the bottom of said cup-shaped container and contacting with the bottom thereof, an electric heating element enclosed within the space between said casing and the bottom of said container, securing means extending through the bottoms of the container and of the casing and through said heating element and means on said securing means to retain said electric heating element supported above the bottom of said casing.

Des Moines, Iowa, October 11th, 1932.

ANDREW S. KNAPP.